US011030204B2

(12) United States Patent
Oks et al.

(10) Patent No.: US 11,030,204 B2
(45) Date of Patent: Jun. 8, 2021

(54) SCALE OUT DATA STORAGE AND QUERY FILTERING USING DATA POOLS

(71) Applicant: MICROSOFT TECHNOLOGY LICENSING, LLC, Redmond, WA (US)

(72) Inventors: Stanislav A. Oks, Kirkland, WA (US); Travis Austin Wright, Issaquah, WA (US); Jasraj Uday Dange, Redmond, WA (US); Jarupat Jisarojito, Redmond, WA (US); Weiyun Huang, Bellevue, WA (US); Stuart Padley, Seattle, WA (US); Umachandar Jayachandran, Sammamish, WA (US); Sahaj Saini, Seattle, WA (US); William Maxwell Lerch, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 71 days.

(21) Appl. No.: 16/169,841

(22) Filed: Oct. 24, 2018

(65) Prior Publication Data

US 2019/0362011 A1 Nov. 28, 2019

Related U.S. Application Data

(60) Provisional application No. 62/675,539, filed on May 23, 2018.

(51) Int. Cl.
G06F 16/2458 (2019.01)
G06F 16/27 (2019.01)
(Continued)

(52) U.S. Cl.
CPC ...... *G06F 16/2471* (2019.01); *G06F 16/2457* (2019.01); *G06F 16/24552* (2019.01); *G06F 16/278* (2019.01); *G06F 16/284* (2019.01)

(58) Field of Classification Search
CPC .......................... G06F 16/2471; G06F 16/278
See application file for complete search history.

(56) References Cited

U.S. PATENT DOCUMENTS

2012/0310916 A1 12/2012 Abadi et al.
2014/0052734 A1 2/2014 Lee et al.
(Continued)

FOREIGN PATENT DOCUMENTS

EP 2778967 A1 9/2014
WO 2013155752 A1 10/2013

OTHER PUBLICATIONS

Ameloot, et al., "Data Partitioning for Single-Round Multi-Join Evaluation in Massively Parallel Systems", In Proceedings of the ACM SIGMOD Record, vol. 45, Issue 1, Jun. 2, 2016, pp. 33-40.
(Continued)

Primary Examiner — Charles E Lu
(74) Attorney, Agent, or Firm — Workman Nydegger

(57) ABSTRACT

Performing a distributed query across a data pool includes receiving a database query at a master node or a compute pool within a database system. Based on receiving the database query, a data pool within the database system is identified. The data pool comprises a plurality of data nodes. Each data node includes a relational engine and relational storage. Each node in the data pool caches a different partition of data from an external data source in its relational storage. The database query is processed across the plurality of data nodes. Query processing includes requesting that data node perform a filter operation against its cached partition of the external data source stored in its relational
(Continued)

storage and return any data from the partition that matches the filter operation.

20 Claims, 8 Drawing Sheets

(51) Int. Cl.
*G06F 16/28* (2019.01)
*G06F 16/2457* (2019.01)
*G06F 16/2455* (2019.01)

(56) References Cited

U.S. PATENT DOCUMENTS

| | | | |
|---|---|---|---|
| 2014/0074774 | A1 | 3/2014 | Ito et al. |
| 2014/0130056 | A1 | 5/2014 | Goodman |
| 2015/0074151 | A1* | 3/2015 | Chaiken .............. G06F 16/221 707/803 |
| 2015/0081668 | A1 | 3/2015 | Sankaranarayanan et al. |
| 2015/0234682 | A1* | 8/2015 | Dageville ............ G06F 16/128 718/104 |
| 2015/0269239 | A1* | 9/2015 | Swift .................... G06F 16/27 707/610 |
| 2015/0302075 | A1 | 10/2015 | Schechter et al. |
| 2016/0092510 | A1 | 3/2016 | Samantaray et al. |
| 2016/0179915 | A1 | 6/2016 | Grebnov et al. |
| 2016/0188594 | A1* | 6/2016 | Ranganathan ........ G06F 9/5066 707/769 |
| 2016/0321562 | A1 | 11/2016 | Zeng |
| 2016/0350392 | A1* | 12/2016 | Rice .................. G06F 16/2282 |
| 2018/0004864 | A1 | 1/2018 | Chainer et al. |
| 2018/0025281 | A1 | 1/2018 | Bose et al. |
| 2018/0060132 | A1 | 3/2018 | Maru et al. |
| 2018/0068004 | A1 | 3/2018 | Lavasani |
| 2019/0340518 | A1 | 11/2019 | Merrill et al. |
| 2019/0361999 | A1 | 11/2019 | Oks et al. |
| 2019/0362004 | A1 | 11/2019 | Oks et al. |
| 2019/0364109 | A1 | 11/2019 | Oks et al. |

OTHER PUBLICATIONS

Baget, et al., "Alaska for Ontology Based Data Access", In Proceedings of the Extended Semantic Web Conference, May 26, 2013, pp. 157-161.

"International Search Report and Written Opinion Issued in PCT Application No. PCT/US2019/030989", dated Jul. 12, 2019, 14 Pages.

Bajda-Pawlikowski, et al., "Efficient Processing of Data Warehousing Queries in a Split Execution Environment", In Proceedings of the ACM SIGMOD International Conference on Management of Data, Jun. 12, 2011, pp. 1165-1176.

Mian, et al., "Provisioning Data Analytic Workloads in a Cloud", In Journal of the Future Generation Computer Systems, vol. 29, Issue 6, Aug. 1, 2013, pp. 1452-1458.

"International Search Report and Written Opinion Issued in PCT Application No. PCT/US2019/030990", dated Aug. 7, 2019, 13 Pages.

"International Search Report and Written Opinion Issued in PCT Application No. PCT/US2019/030991", dated Aug. 7, 2019, 12 Pages.

"International Search Report and Written Opinion Issued in PCT Application No. PCT/US2019/030992" , dated Aug. 7, 2019, 12 Pages.

Wu, et al., "Efficient B-tree Based Indexing for Cloud Data Processing", In Proceedings of the VLDB Endowment, vol. 3, Issue 1-2, Sep. 1, 2010, pp. 1207-1218.

"Non-Final Office Action Issued in U.S. Appl. No. 16/169,928", dated Jun. 11, 2020, 13 Pages.

"Final Office Action Issued in U.S. Appl. No. 16/169,928", dated Oct. 23, 2020, 10 Pages.

"Non Final Office Action Issued in U.S. Appl. No. 16/169,920", dated Dec. 10, 2020, 14 Pages.

"Non Final Office Action Issued in U.S. Appl. No. 16/169,925", dated Nov. 27, 2020, 21 Pages.

"Non Final Office Action Issued in U.S. Appl. No. 16/169,928", dated Jan. 7, 2021, 10 Pages.

"Final Office Action Issued in U.S. Appl. No. 16/169,920", dated Apr. 1, 2021, 13 Pages.

"Final Office Action Issued in U.S. Appl. No. 16/169,928", dated Apr. 1, 2021, 13 Pages.

"Final Office Action Issued in U.S. Appl. No. 16/169,925", dated Apr. 21, 2021, 22 pages.

* cited by examiner

SCALE OUT DATA STORAGE AND QUERY FILTERING USING DATA POOLS

CROSS-REFERENCE TO RELATED APPLICATION

This application claims priority to, and the benefit of, U.S. Provisional Patent Application No. 62/675,539, filed May 23, 2018, and titled "SCALE OUT DATA STORAGE AND QUERY FILTERING USING DATA POOLS," the entire contents of which are incorporated by reference herein in their entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. For example, computer systems are commonly used to store and process large volumes of data using different forms of databases.

Databases can come in many forms. For example, one family of databases follow a relational model. In general, data in a relational database is organized into one or more tables (or "relations") of columns and rows, with a unique key identifying each row. Rows are frequently referred to as records or tuples, and columns are frequently referred to as attributes. In relational databases, each table has an associated schema that represents the fixed attributes and data types that the items in the table will have. Virtually all relational database systems use variations of the Structured Query Language (SQL) for querying and maintaining the database. Software that parses and processes SQL is generally known as an SQL engine. There are a great number of popular relational database engines (e.g., MICROSOFT SQL SERVER, ORACLE, MYSQL POSTGRESQL, DB2, etc.) and SQL dialects (e.g., T-SQL, PL/SQL, SQL/PSM, PL/PGSQL, SQL PL, etc.).

The proliferation of the Internet and of vast numbers of network-connected devices has resulted in the generation and storage of data on a scale never before seen. This has been particularly precipitated by the widespread adoption of social networking platforms, smartphones, wearables, and Internet of Things (IoT) devices. These services and devices tend to have the common characteristic of generating a nearly constant stream of data, whether that be due to user input and user interactions, or due to data obtained by physical sensors. This unprecedented generation of data has opened the doors to entirely new opportunities for processing and analyzing vast quantities of data, and to observe data patterns on even a global scale. The field of gathering and maintaining such large data sets, including the analysis thereof, is commonly referred to as "big data."

In general, the term "big data" refers to data sets that are voluminous and/or are not conducive to being stored in rows and columns. For instance, such data sets often comprise blobs of data like audio and/or video files, documents, and other types of unstructured data. Even when structured, big data frequently has an evolving or jagged schema. Traditional relational database management systems (DBMSs), may be inadequate or sub-optimal for dealing with "big data" data sets due to their size and/or evolving/jagged schemas.

As such, new families of databases and tools have arisen for addressing the challenges of storing and processing big data. For example, APACHE HADOOP is a collection of software utilities for solving problems involving massive amounts of data and computation. HADOOP includes a storage part, known as the HADOOP Distributed File System (HDFS), as well as a processing part that uses new types of programming models, such as MapReduce, Tez, Spark, Impala, Kudu, etc.

The HDFS stores large and/or numerous files (often totaling gigabytes to petabytes in size) across multiple machines. The HDFS typically stores data that is unstructured or only semi-structured. For example, the HDFS may store plaintext files, Comma-Separated Values (CSV) files, JavaScript Object Notation (JSON) files, Avro files, Sequence files, Record Columnar (RC) files, Optimized RC (ORC) files, Parquet files, etc. Many of these formats store data in a columnar format, and some feature additional metadata and/or compression.

As mentioned, big data processing systems introduce new programming models, such as MapReduce. A MapReduce program includes a map procedure, which performs filtering and sorting (e.g., sorting students by first name into queues, one queue for each name), and a reduce method, which performs a summary operation (e.g., counting the number of students in each queue, yielding name frequencies). Systems that process MapReduce programs generally leverage multiple computers to run these various tasks in parallel and manage communications and data transfers between the various parts of the system. An example engine for performing MapReduce functions is HADOOP YARN (Yet Another Resource Negotiator).

Data in HDFS is commonly interacted with/managed using APACHE SPARK, which provides Application Programming Interfaces (APIs) for executing "jobs" which can manipulate the data (insert, update, delete) or query the data. At its core, SPARK provides distributed task dispatching, scheduling, and basic input/output functionalities, exposed through APIs for interacting with external programming languages, such as Java, Python, Scala, and R.

Given the maturity of, and existing investment in database technology many organizations may desire to process/analyze big data using their existing relational DBMSs, leveraging existing tools and knowhow. This may mean importing large amounts of data from big data stores (e.g., such as HADOOP's HDFS) into an existing DBMS. Commonly, this is done using custom-coded extract, transform, and load (ETL) programs that extract data from big data stores, transform the extracted data into a form compatible with traditional data stores, and load the transformed data into an existing DBMS.

The import process requires not only significant developer time to create and maintain ETL programs (including adapting them as schemas change in the DBMS and/or in the big data store), but it also requires significant time—including both computational time (e.g., CPU time) and elapsed real time (e.g., "wall-clock" time)—and communications bandwidth to actually extract, transform, and transfer the data.

Given the dynamic nature of big data sources (e.g., continual updates from IoT devices), use of ETL to import big data into a relational DBMS often means that the data is actually out of date/irrelevant by the time it makes it from the big data store into the relational DBMS for processing/analysis. Further, use of ETL leads to data duplication, an increased attack surface, difficulty in creating/enforcing a consistent security model (i.e., across the DBMS and the big data store(s)), geo-political compliance issues, and difficulty in complying with data privacy laws, among other problems.

Further complicating management of DBMSs and big data systems is planning for and adapting to both computational and storage needs. For example, DBMSs are generally vertically grown—i.e., if more compute or storage capacity is needed it is added to a single computer system, or a more capable computer system is provisioned, and the DBMS is manually migrated to that new computer system. Adding in big data storage and analysis leads to further use of computing resources and requires provisioning of entirely separate computing resources.

BRIEF SUMMARY

At least some embodiments described herein provide for scale out data storage and query filtering using data pools in a database system. Data pools enable the database system to scale out relational storage and relational processing capacity. In embodiments, data pools can be configured to ingest data from one or more external data sources, such as by ingesting and caching a different partition of an external data source at each data node in a data pool. As will be appreciated in view of the disclosure herein, these embodiments represent significant advancements in the technical field of databases. For example, by providing for data pools, the embodiments herein enable relational database scale out functionality that has not been available before. Additionally, as will be explained herein, by enabling a data pool in ingest and cache external data sources, embodiments can provide for seamless migrations, can provide scale-out to queries over data sourced from external data sources, and can improve query performance of data sourced from external data sources.

In some embodiments, systems, methods, and computer program products for performing a distributed query across a data pool includes receiving a database query at a master node or a compute pool within a database system. Based on receiving the database query, a data pool within the database system is identified. The data pool comprises a plurality of data nodes, each data node including a relational engine and relational storage. Each data node in the data pool caches a different partition of data from an external data source in its relational storage. The database query is processed across the plurality of data nodes. The query processing includes requesting that each data node perform an operation against its cached partition of the external data source stored in its relational storage, and return any data from the partition that matches the filter operation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein provide for scale out data storage and query filtering using data pools in a database system. Data pools enable the database system to scale out relational storage and relational processing capacity. In embodiments, data pools can be configured to ingest data from one or more external data sources, such as by ingesting and caching a different partition of an external data source at each data node in a data pool. As will be appreciated in view of the disclosure herein, these embodiments represent significant advancements in the technical field of databases. For example, by providing for data pools, the embodiments herein enable relational database scale out functionality that has not been available before. Additionally, as will be explained herein, by enabling a data pool to ingest and cache external data sources, embodiments can provide for seamless migrations, can provide scale-out to queries over data sourced from external data sources, and can improve query performance of data sourced from external data sources.

Figure 1:
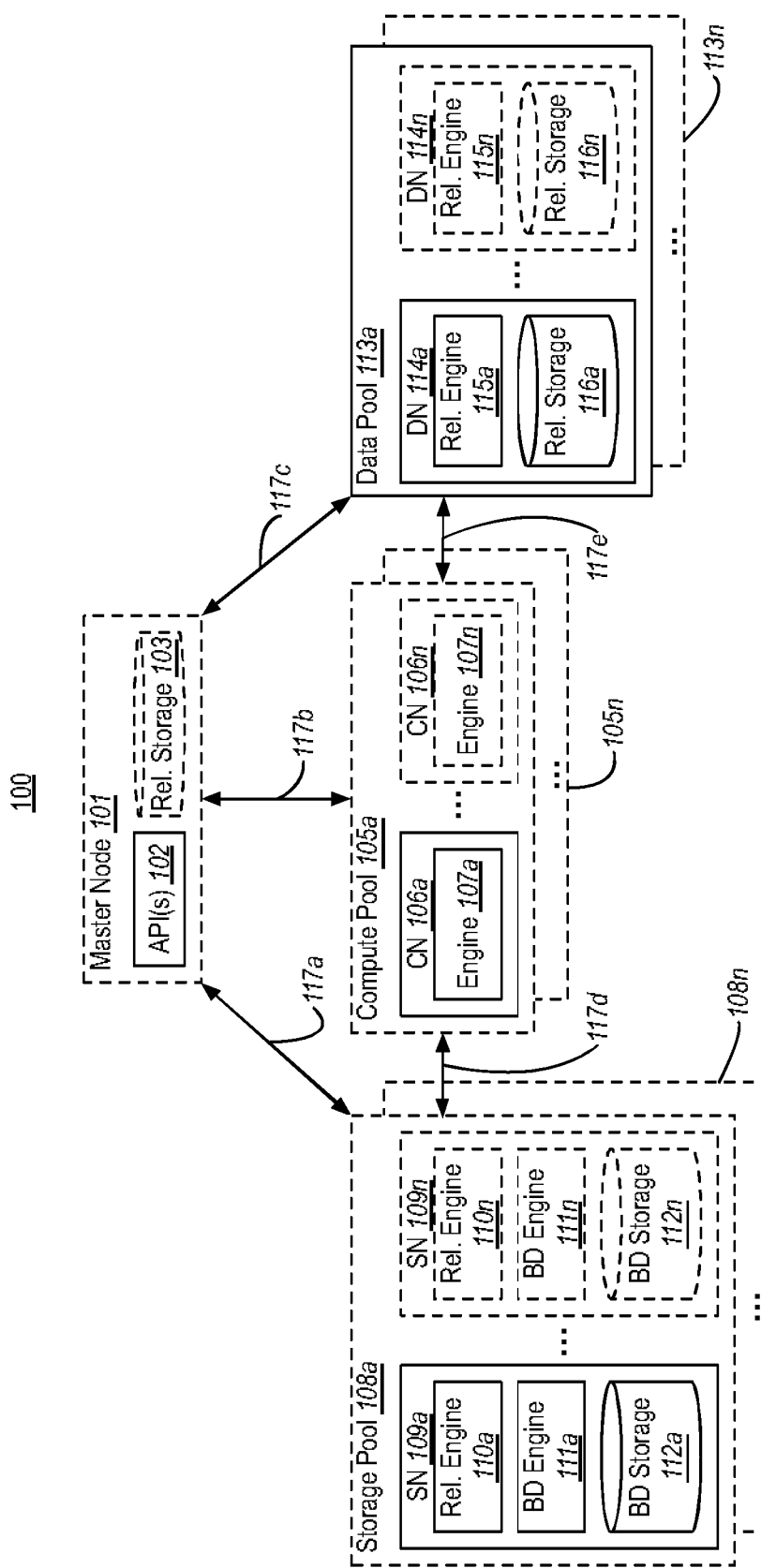
FIG. 1 illustrates an example of a database system that enables scale out data storage and query filtering using storage pools.

FIG. 1 illustrates an example of a database system 100 that enables scale out data storage and query filtering using data pools. As shown, database system 100 might include a master node 101. If included, the master node 101 is an endpoint that manages interaction of the database system 100 with external consumers (e.g., other computer systems, software products, etc., not shown) by providing API(s) 102 to receive and reply to queries (e.g., SQL queries). As such, master node 101 can initiate processing of queries received from consumers using other elements of database system 100 (e.g., compute pool(s) 105, storage pool(s) 108, and/or data pool(s) 113, which are described later). Based on obtaining results of processing of queries, the master node 101 can send results back to requesting consumer(s).

In some embodiments, the master node 101 could appear to consumers to be a standard relational DBMS. Thus, API(s) 102 could be configured to receive and respond to traditional relational queries. In these embodiments, the master node 101 could include a traditional relational DBMS engine. However, in addition, master node 101 might also facilitate big data queries (e.g., SPARK or MapReduce jobs). Thus, API(s) 102 could also be configured to receive and respond to big data queries. In these embodiments, the master node 101 could also include a big data engine (e.g., a SPARK engine). Regardless of whether master node 101 receives a traditional DBMS query or a big data query, the master node 101 is enabled to process that query over a combination of relational data and big data. While database system 100 provides expandable locations for storing DBMS data (e.g., in data pools 113, as discussed below), it is also possible that master node 101 could include its own relational storage 103 as well (e.g., for storing relational data).

As shown, database system 100 can include one or more compute pools 105 (shown as 105a-105n). If present, each compute pool 105 includes one or more compute nodes 106 (shown as 106a-106n). The ellipses within compute pool 105a indicate that each compute pool 105 could include any number of compute nodes 106 (i.e., one or more compute nodes 106). Each compute node can, in turn, include a corresponding compute engine 107a (shown as 107a-107n).

In embodiments, the master node 101 can pass a query received at API(s) 102 to at least one compute pool 105 (e.g., arrow 117b). That compute pool (e.g., 105a) can then use one or more of its compute nodes (e.g., 106a-106n) to process the query against storage pools 108 and/or data pools 113 (e.g., arrows 117d and 117e). These compute node(s) 106 process this query using their respective compute engine 107. After the compute node(s) 106 complete processing of the query, the selected compute pool(s) 105 pass any results back to the master node 101. As will be discussed, in some embodiments, compute pools 105 could also be used to execute scripts (e.g., R, Python, etc.) for training and scoring artificial intelligence (AI) and/or machine learning (ML) models.

In embodiments, by including compute pools 105, the database system 100 can enable compute capacity (e.g., query processing, AI/ML training/scoring, etc.) of the database system 100 to be to be scaled up efficiently (i.e., by adding new compute pools 105 and/or adding new compute nodes 106 to existing compute pools). The database system 100 can also enable compute capacity to be scaled back efficiently (i.e., by removing existing compute pools 105 and/or removing existing compute nodes 106 from existing compute pools). This enables the database system 100 to scale-out its compute capacity horizontally by provisioning new compute nodes 106 (e.g., physical hardware, virtual machines, containers, etc.). As such, database system 100 can quickly and efficiently expand or contract its compute capacity as compute demands (e.g., query volume and/or complexity, AI/ML training/scoring demands, etc.) vary.

In embodiments, if the database system 100 lacks compute pool(s) 105, then the master node 101 may itself handle query processing against storage pool(s) 108, data pool(s) 113, and/or its local relational storage 103 (e.g., arrows 117a and 117c). In embodiments, if one or more compute pools 105 are included in database system 100, these compute pool(s) could be exposed to external consumers directly. In these situations, an external consumer might bypass the master node 101 altogether (if it is present), and initiate queries on those compute pool(s) directly. As such, it will be appreciated that the master node 101 could potentially be optional. If the master node 101 and compute pool(s) 105 are both present, the master node 101 might receive results from each compute pool 105 and join/aggregate those results to form a complete result set.

As shown, database system 100 can include one or more storage pools 108 (shown as 108a-108n). If present, each storage pool 108 includes one or more storage nodes 109 (shown as 109a-109n). The ellipses within storage pool 108a indicate that each storage pool could include any number of storage nodes (i.e., one or more storage nodes). As shown, each storage node 109 includes a corresponding relational engine 110 (shown as 110a-110n), a corresponding big data engine 111 (shown as 111a-111n), and corresponding big data storage 112 (shown as 112a-112n). For example, the big data engine 111 could be a SPARK engine, and the big data storage 112 could be HDFS storage. Since storage nodes 109 include big data storage 112, data can be stored at storage nodes 109 using "big data" file formats (e.g., CSV, JSON, etc.), rather than more traditional relational or non-relational database formats. In general, each storage node 109 in storage pool 108 can store a different partition of a big data set.

Notably, storage nodes 109 in each storage pool 108 can include both a relational engine 110 and a big data engine 111. These engines 110, 111 can be used—singly or in combination—to process queries against big data storage 112 using relational database queries (e.g., SQL queries) and/or using big data queries (e.g., SPARK queries). Thus, the storage pools 108 allow big data to be natively queried with a relational DBMS's native syntax (e.g., SQL), rather than requiring use of big data query formats (e.g., SPARK). For example, storage pools 108 could permit queries over data stored in HDFS-formatted big data storage 112, using SQL queries that are native to a relational DBMS.

This means that big data can be queried/processed without the need to write custom tasks (e.g., ETL programs)—making big data analysis fast and readily accessible to a broad range of DBMS administrators/developers. Further, because storage pools 108 enable big data to reside natively within database system 100, they eliminate the need to use ETL techniques to import big data into a DBMS, eliminating the drawbacks described in the Background (e.g., maintaining ETL tasks, data duplication, time/bandwidth concerns, security model difficulties, data privacy concerns, etc.).

By including storage pools 108, the database system 100 can enable big data storage and processing capacity of the database management system 100 to be scaled up efficiently (i.e., by adding new storage pools 108 and/or adding new storage nodes 109 to existing storage pools). The database system 100 can also enable big data storage and processing capacity to be scaled back efficiently (i.e., by removing existing storage pools 108 and/or removing existing storage nodes 109 from existing storage pools). This enables the database management system 100 to scale-out its big data storage and processing capacity horizontally by provisioning new storage nodes 109 (e.g., physical hardware, virtual machines, containers, etc.). As such, database management system 100 can quickly and efficiently expand or contract its big data storage and processing capacity as the demands for big data storage capacity and processing varies.

As shown, database system 100 includes one or more data pools 113 (shown as 113a-113n). Each data pool 113 includes one or more data nodes 114 (shown as 114a-114n). The ellipses within data pool 113a indicate that each data pool could include any number of data nodes (i.e., one or more data nodes). As shown, each data node 113 includes a corresponding relational engine 115 (shown as 115a-115n) and corresponding relational storage 116 (shown as 116a-116n). Thus, data pools 113 can be used to store and query relational data stores, where the data is partitioned across individual relational storage 116 within each data node 113.

Similar to storage pools 103, by including data pools 113 the database system 100 can enable relational storage and processing capacity of the database management system 100 to be scaled up efficiently (i.e., by adding new data pools 113 and/or adding new data nodes 114 to existing data pools). The database system 100 can also enable relational storage and processing capacity to be scaled back efficiently (i.e., by removing existing data pools 113 and/or removing existing data nodes 114 from existing data pools). This enables the database management system 100 to scale-out its relational data storage and processing capacity horizontally by provisioning new data nodes 113 (e.g., physical hardware, virtual machines, containers, etc.). As such, database management system 100 can quickly and efficiently expand or contract its relational storage and processing capacity as the demands for relational data storage and processing capacity varies.

Using the relational storage 103, storage pools 108, and/or data pools 113, the database system 100 might be able to process a query (whether that be a relational query or a big data query) over a combination of relational data and big data. Thus, for example, a single query can be processed (e.g., by master node 101 and/or compute pools 105) over any combination of (i) relational data stored at the master node 101 in relational storage 103, (ii) big data stored in big data storage 112 at one or more storage pools 108, and (iii) relational data stored in relational storage 116 at one or more data pools 113. This may be accomplished, for example, by the master node 101 and/or the compute pools 105 creating an "external" table over any data stored at relational storage 103, big data storage 112, and/or relational storage 116. In embodiments, an external table is a logical table that represents a view of data stored in these locations. A single query, sometimes referred to as a global query, can then be processed against a combination of external tables.

As mentioned in connection with compute pools 106, database system 100 may execute scripts (e.g., R, Python, etc.) for training and scoring AI and/or ML models based on data stored in database system 100. Similar to how database system 100 enables a query to be run over a combination of relational and big data, database system 100 can also enable such scripts to be run over the combination of relational and big data to train these AI/ML models. Once an AI/ML model is trained, scripts can also be used to "score" the model. In the field of ML, scoring (also called prediction) is the process of new generating values based on a trained ML model, given some new input data. These newly generated values can be sent to an application that consumes ML results or can be used to evaluate the accuracy and usefulness of the model.

FIGS. 2A-2D illustrates example database systems 200a-200d in which one or more compute pools 205 are used to perform query (or script) processing across data stored at storage pools 208 and/or data pools 213. The numerals (and their corresponding elements) in FIGS. 2A-2D correspond to similar numerals (and corresponding elements) from FIG. 1. For example, compute pool 205a corresponds to compute pool 105a, storage pool 208a corresponds to storage pool 108a, and so on. As such, all of the description of database system 100 of FIG. 1 applies to database systems 200a-200d of FIGS. 2A-2D. Likewise, all of the additional description of database systems 200a-200d of FIGS. 2A-2D could be applied to database system 100 of FIG. 1.

In FIGS. 2A-2D, one or more of the compute pools 205 can receive one or more queries/scripts from master node 201 and/or from an external consumer. Based on receipt of a query/script, a compute pool 205a can use its compute nodes 206 to execute one or more queries against one or more of the storage pools 208 and/or one or more of the data pools 213. In some embodiments, these queries could be executed in a parallel and distributed manner by the compute nodes 206, as detailed below.

Figure 2A:
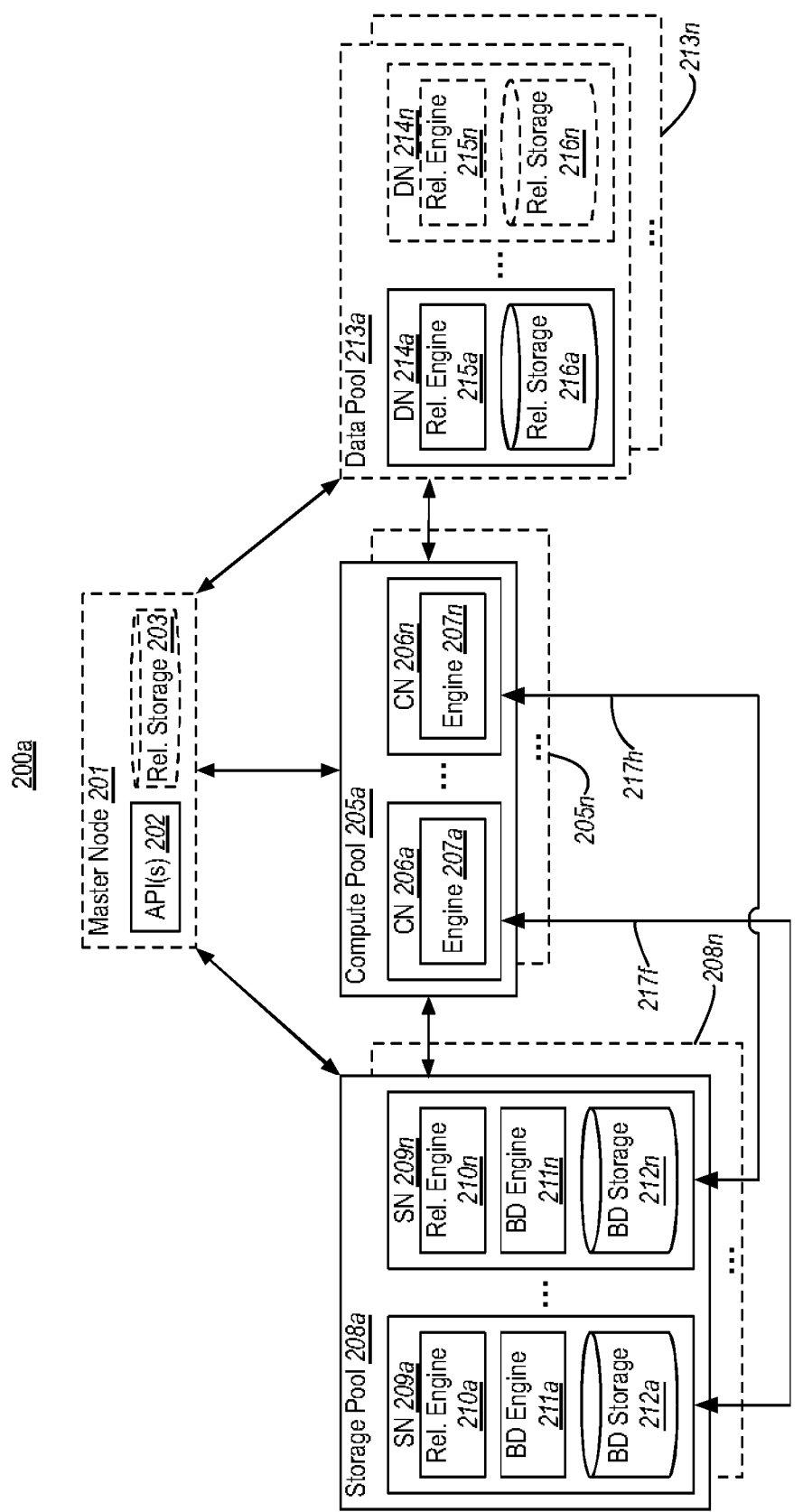
FIG. 2A illustrates an example database system that uses a compute pool for distributed query processing over a storage pool.

For example, in FIG. 2A, database system 200a includes at least one compute pool 205a and at least one storage pool 208a. As shown by arrows 217f and 217h, each compute node 206 in compute pool 205a could query one or more storage nodes 209 in one or more storage pools 208. In some embodiments, this may include the compute engines 207 at the compute nodes 206 coordinating with the relational engines 210 and/or big data engines 211 at the storage nodes 209. This coordination could include, for example, each compute engine 207 requesting that a relational engine 210 and/or big data engine 211 at a storage node 209 execute an operation across its corresponding partition of a data set stored in its big data storage 212.

Figure 2B:
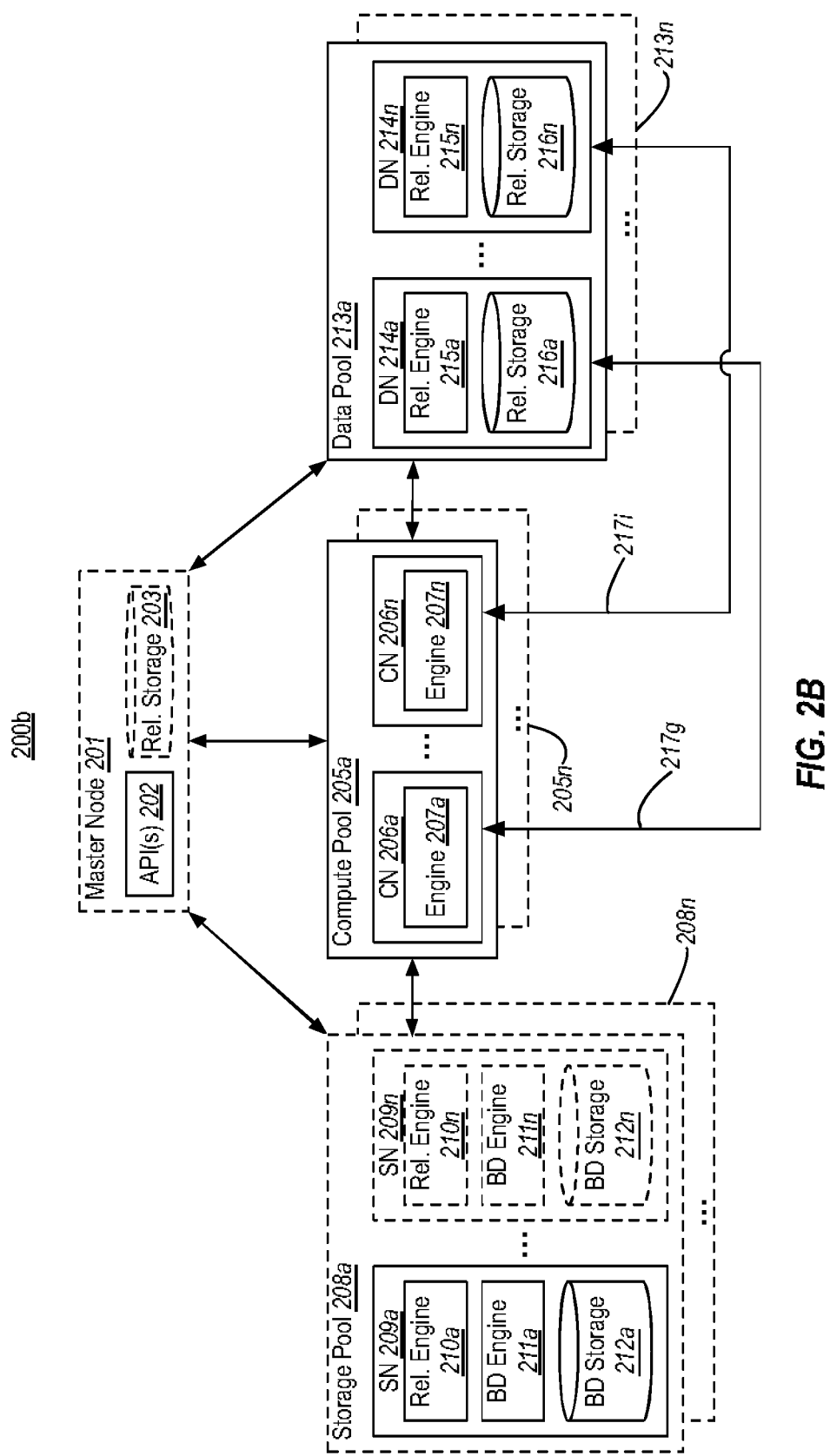
FIG. 2B illustrates an example database system that uses a compute pool for distributed query processing over a data pool.

In FIG. 2B, on the other hand, database system 200b includes at least one compute pool 205a and at least one data pool 213a. As shown by arrows 217g and 217i, each compute node 206 in compute pool 205a could query one or more data nodes 214 in one or more data pools 213. In some embodiments, this may include the compute engines 207 at the compute nodes 206 coordinating with the relational engines 215 at the data nodes 214. This coordination could include, for example, each compute engine 207 requesting that a relational engine 215 at a data node 214 execute an operation across its corresponding partition of a data set stored in its relational storage 216.

Figure 2C:
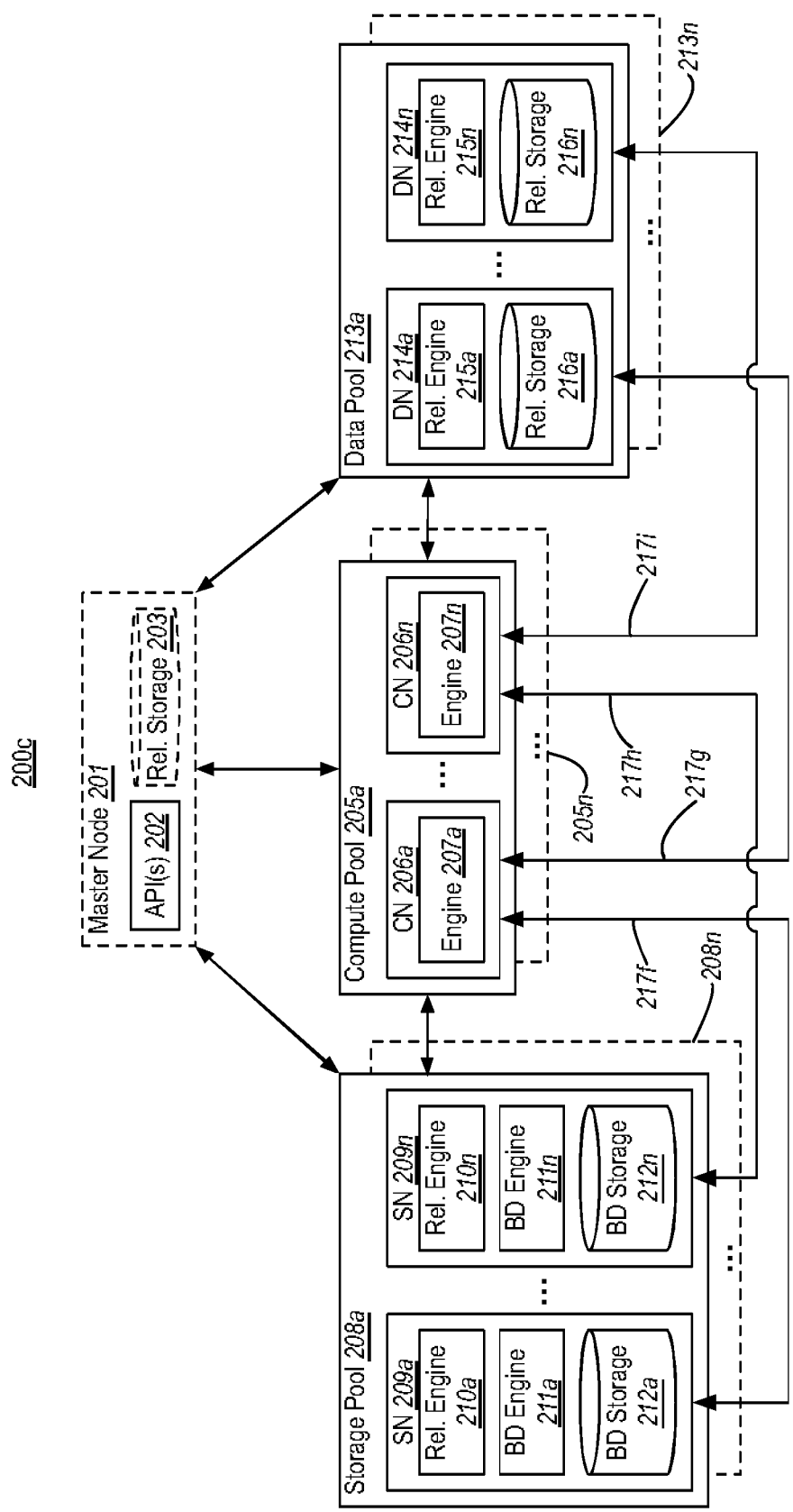
FIG. 2C illustrates an example database system that uses a compute pool for distributed query processing over a storage pool and a data pool.

In FIG. 2C database system 200c includes a compute pool 205a as well as both a storage pool 208a and a data pool 213a. As shown by arrows 217f and 217h, each compute node 206 in compute pool 205a might query one or more storage nodes 209 in one or more storage pools 208. In some embodiments, this may include the compute engines 207 at the compute nodes 206 coordinating with the relational engines 210 and/or big data engines 211 at the storage nodes 209. This coordination could include, for example, each compute engine 207 requesting that a relational engine 210 and/or big data 211 engine at a storage node 209 execute an operation across its corresponding partition of a data set stored in its big data storage 212. Likewise, as shown by arrows 217g and 217i, each compute node 206 in compute pool 205a might additionally, or alternatively, query one or more data nodes 214 in one or more data pools 213. In some embodiments, this may include the compute engines 207 at the compute nodes 206 coordinating with the relational engines 215 at the data nodes 214. This coordination could include, for example, each compute engine 207 requesting that a relational engine 215 at a data node 214 execute an operation across its corresponding partition of a data set stored in its relational storage 216.

It is noted that, for brevity, each compute node 206 is illustrated in FIG. 2C as querying both a storage node and a data node. It will be appreciated, however, that in embodiments a compute node 206 may query only storage node(s) 209 or only data node(s) 214. For example, there could be four compute nodes in compute pool 205a, with two of the compute nodes querying respective storage nodes 209, and the other two compute nodes querying respective data nodes 214. In an alternate example, there could be two compute pools—such as compute pools 205a and 205n. In this example, compute nodes in compute pool 205a might query respective storage nodes 209, while compute nodes in compute pool 205n might query respective data nodes 214. Variations of these two examples are also possible.

In FIGS. 2A-2C, example operations requested by compute nodes 206 could be filter operations (e.g., a "WHERE" clause in an SQL query), column projection operations, aggregation operations (e.g., local aggregates, partial aggregation), join operations (e.g., partial joins), and the like. Each storage node 209 and/or data node 214 executes a requested operation across its partition of data, and passes any data stored at the node that is produced by the operation back up to the requesting compute node 206. In embodiments, once the compute nodes 206 in each compute pool 205 have received their corresponding portions of results from the various storage/data nodes, they operate together to aggregate/assemble this data order to form one or more results for the original query/script. Each compute pool 205 then passes these result(s) back to the requesting master node 201 and/or external consumer.

Figure 2D:
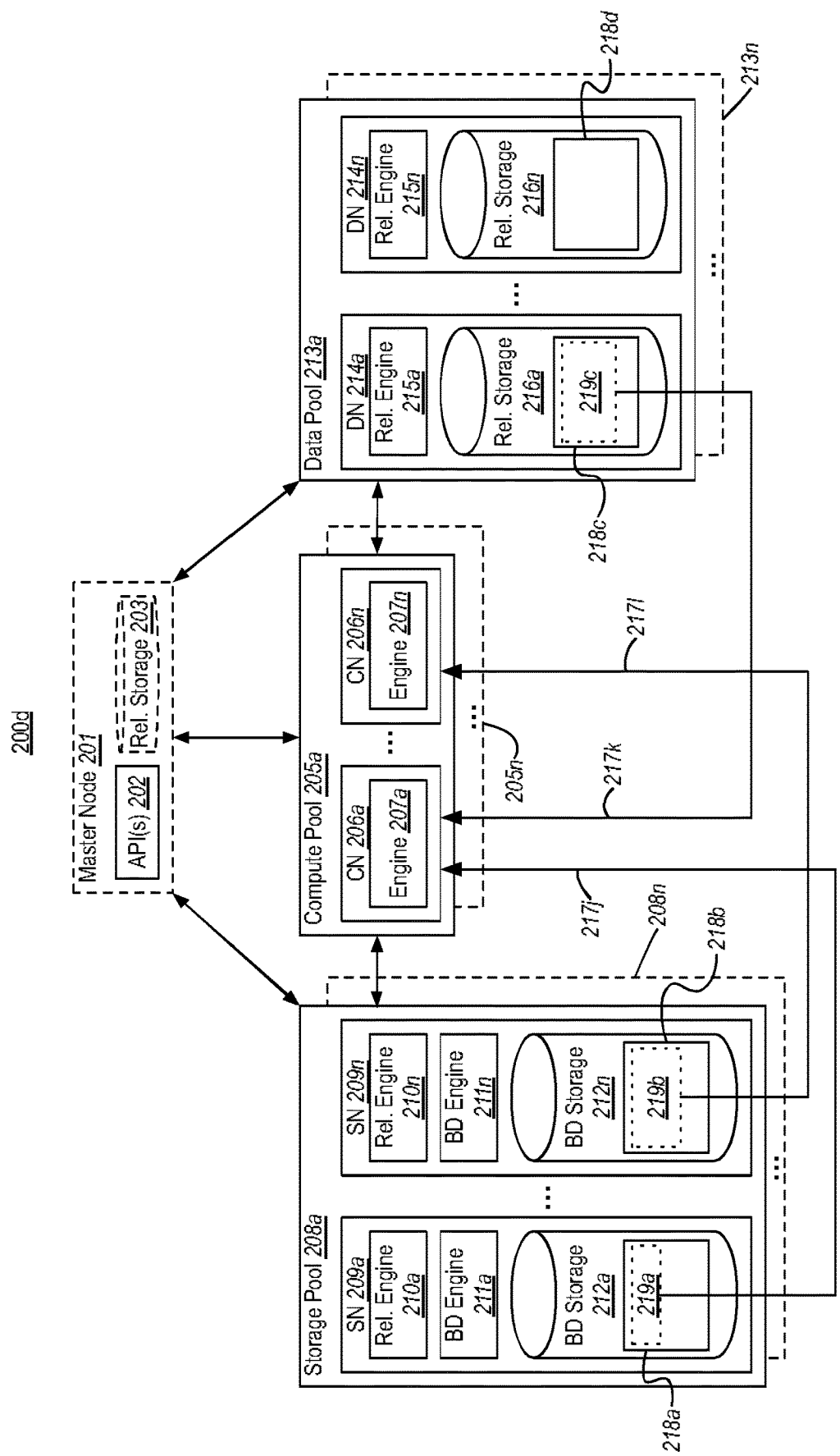
FIG. 2D illustrates an example of a compute pool performing distributed query processing over a storage pool and a data pool in a partitioned manner.

FIG. 2D provides a more concrete example of compute pools 205 receiving corresponding portions of results from partitioned data. In particular, FIG. 2D illustrates a database management system 200d, which is generally the same as database management system 200c of FIG. 2C, but in which the big data storage 212 and relational storage 216 have been visually expanded to show that there could be different partitions 218 (shown as 218a-218d) of one or more data sets that are stored at the big data storage 212 and/or at the relational storage 216. While the example of FIG. 2D (which continues the example, of FIG. 2C) illustrates a query across both storage pools 208 and data pools 213, it will be appreciated that the same concepts apply to queries across storage pools only (e.g., FIG. 2A) and/or to queries across data pools only (e.g., FIG. 2B).

In view of the description of FIG. 2C, it will be appreciated that compute nodes 206 of compute pool 205a could have requested that the storage nodes 209 of storage pool 208a and data nodes 214 of data pool 213a perform one or more operations (e.g., a filter operation) as part of a query on one or more data sets. As shown in FIG. 2D, based on having performed these operation(s), some of these nodes could have identified matching portions of data. For example, storage nodes 209a and 209n could have identified data portions 219a and 219b in partitions 218a and 218b, and data node 214a could have identified data portion 219c in partition 218c. Notably, data node 214n has not identified matching data within is corresponding partition 218d. The matching data portions 219a-219c are shown in different sizes to emphasize the matched data could be different at each node, since the nodes store different partitions of a data set. As shown by arrows 217j-217l, the nodes having matching data could pass this data back to the requesting compute nodes 206 in compute pool 205a. These compute nodes 206 can then aggregate/assemble this data to form a final result, which is passed back to the master node 201 and/or a requesting external consumer.

While FIGS. 2A-2D have illustrated embodiments in which compute pools 205 are present, it will be appreciated that queries can be distributed across storage pools 208 and/or data pools 213 even when compute pools 205 are not present. For example, master node 201 might directly query one or more storage nodes 209 and/or one or more data nodes 214. In some embodiments, there could even be more than one master node 201, and these plural master nodes could each directly query one or more storage nodes 209 and/or one or more data nodes 214.

Figure 3:
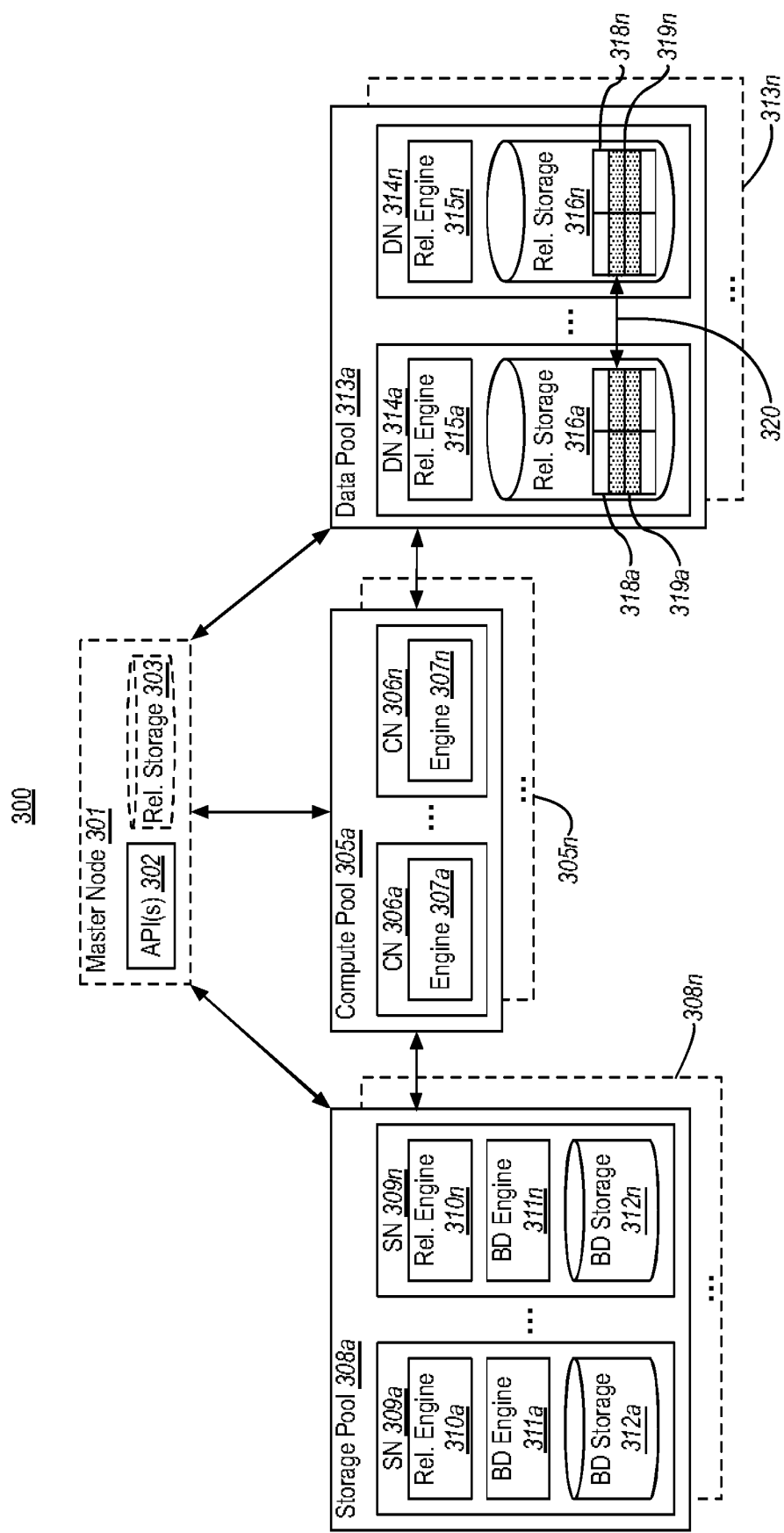
FIG. 3 illustrates an example database system that includes data nodes that provide sharding of data across the nodes.

With specific reference to data pools, some embodiments can enable data nodes at data pools to shard/replicate data across the various data nodes. For example, FIG. 3 illustrates example database system 300 that includes data nodes that provide sharding of data across the nodes. The numerals (and their corresponding elements) in FIG. 3 correspond to similar numerals (and corresponding elements) from FIG. 1. For example, compute pool 305a corresponds to compute pool 105a, data pool 313a corresponds to data pool 113a, and so on. As such, all of the description of database system 100 of FIG. 1 applies to database system 300 of FIG. 3. Likewise, all of the additional description of database system 300 of FIG. 3 could be applied to database system 100 of FIG. 1.

In FIG. 3, the relational storage is shown as including relational data 318 (shown as 318a-318n) that includes shards 319 (shown as 319a-319n as shaded rows). In general, a shard 319 can comprise a "horizontal" partition of data. In relational databases, for example, a shard can comprise one or more rows of data that are held separately (e.g., as opposed to being split "vertically" into columns). As indicated by arrow 320, relational data 318 can be split across different data nodes 314 (e.g., such that multiple data nodes 314 store the different sets of database rows also known as shards 319). By sharding data stored at the relational storage 316 in this manner, data pool 313a can provide for concurrent queries over the sharded data, thereby increasing query performance. In some embodiments, when sharding data, a data pool 313 may store data that is primarily static and may process queries that are primarily read-only.

Figure 4:
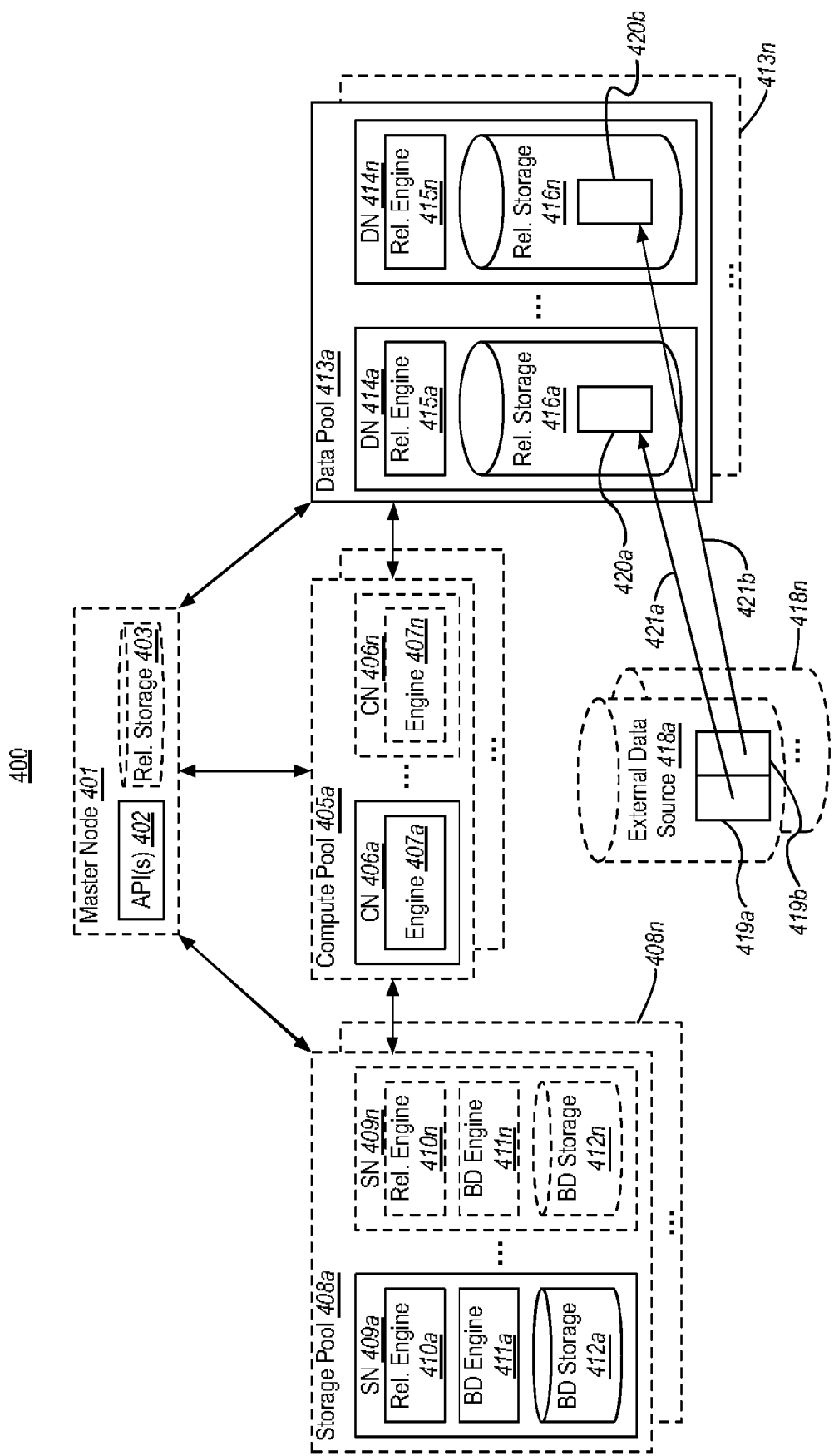
FIG. 4 illustrates an example database system that includes data nodes that cache data from an external data source.

In additional, or alternative, embodiments, data pools can be configured as caches for external data sources. For example, FIG. 4 illustrates example database system 400 that includes data nodes that cache data from an external data source. The numerals (and their corresponding elements) in FIG. 4 correspond to similar numerals (and corresponding elements) from FIG. 1. For example, compute pool 405a corresponds to compute pool 105a, data pool 413a corresponds to data pool 113a, and so on. As such, all of the description of database system 100 of FIG. 1 applies to database system 400 of FIG. 4. Likewise, all of the additional description of database system 400 of FIG. 4 could be applied to database system 100 of FIG. 1.

In FIG. 4, data pool 413a is shown as being in communication with one or more external data sources 418 (shown as 418a-418n). An external data source 418 could be any type of data source that stores relational data, or from which relational data could be derived. For example, external database 418a could be another type of relational database, or a source of unstructured data, such as from IoT devices, or an API for accessing data in another system that can be readily converted to relational formats.

Data pools 413 can be configured as caches for these external data sources 418. For example, if external data source 418a is another relational database, data pool 413a could periodically ingest data from this external data source 418a and cache this data in its data nodes 414. In such embodiments, each data node 414 in data pool 413 might ingest and cache a different partition of data from this external data source 418a. For example, as shown, external data source 418a might store a data set that can be partitioned into at least two partitions 419a and 419b. In this case, data node 414a might ingest and cache a copy 420a of partition 419a in its relational storage 416a (as indicated by arrow 421a), and data node 414n might ingest and cache a copy 420b of partition 419b in its relational storage 416n (as indicated by arrow 421b).

When ingesting data from external data sources, database system 400 can partition the data in any appropriate manner (horizontally or vertically). For example, if external database 418a stores aircraft engine telemetry data for an airline, data node 414a might cache a partition 419a of data comprising engine telemetry data for engines #1-20, while data node 414n might caches a partition 414b of data comprising engine telemetry data for engines #21-40. Additionally, or alternatively, data pool 413 might replicate data from relational storage 403.

Ingesting and caching data from external data sources 418 can serve several purposes. For example, once data from external data source 418a is fully ingested into data pool 413a, queries over this data from external consumers can be serviced by data pool 413a directly, instead of (and/or in addition to) external data source 418a. This can decrease the load on the external data source 418a and provide all the benefits of scale-out data pools 413 to data stored in the external database 418a, resulting in faster execution of queries.

In another example, ingesting and caching data from external data sources 418 can provide an efficient mechanism for migrating away from the external data sources 418. For example, as in initial step in performing a migration, an existing DBMS can be added as external data source 418a, and its data can then be ingested/cached at data pool 413a. From there, queries from existing database consumers can be directed (e.g., by master node 401 or compute nodes 406) to data pool 413a instead of external database 418a. If existing database consumers query external database 418 directly, they can be instructed to query data pool 413a (or master node 401) instead. Data can then be gradually moved from data source 418a to data pool 413a or master node 401. Traffic to the external database 418a can be monitored, and when external consumers have stopped querying it directly it might be considered safe to remove it from database system 400 and stop using it completely.

It will be appreciated, in view of the discussion herein, that when ingesting/caching external data sources 418, it may be desirable to ingest data that is primarily static. Thus, in general, relational storage 416 might operate as read-only storage, except when data pools 413 are ingesting data from external data sources 418. During the ingestion process, it may be that new rows can be inserted into relational storage 416, but existing rows cannot be modified. However, embodiments could also operate on read/write data and queries that write data. In these embodiments, however, write queries might be directed to the external data sources 418, and data might be periodically re-ingested into the data pools 413.

In some implementations, data pools 413 might communicate with external data sources 418 directly. However, in other implementations data pools 413 might communicate with external data sources 418 only through the master node 401 and/or the compute pools 405.

As explained previously, data stored in the storage pools 408 and the data pools 413 might be grouped into logical views as external tables. In some embodiments, this concept could be extended to external data sources 418 as well. Thus, for example, a single query at master node 401 could query a combination of external tables that comprise data stored at combinations of storage pools 108, data pools 413, and/or external data sources 418. In some implementations, a query could even join data from multiple external data sources 418 of different types. For example, external tables from two different types of relational databases could exposed to database management system 400. Then, a query could be developed that includes data from both of these two external tables.

Figure 5:
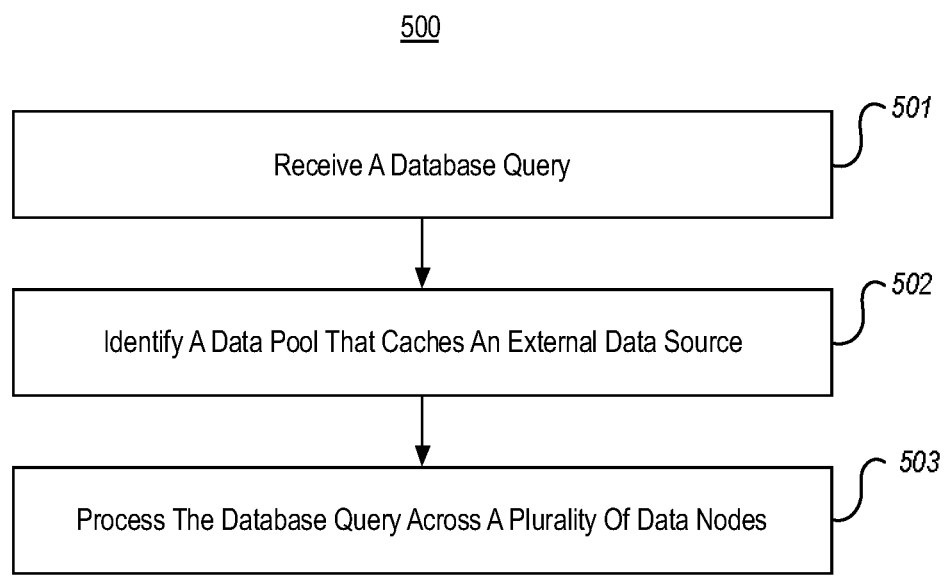
FIG. 5 illustrates a flow chart of an example method for performing a distributed query across a data pool.

While the foregoing description has focused on example systems, embodiments herein can also include methods that are performed within those systems. FIG. 5, for example, illustrates a flow chart of an example method 500 for performing a distributed query across a data pool. In embodiments, method 500 could be performed, for example, within database systems 100, 200a-200d, 300, and/or 400 of FIGS. 1-4.

As shown, method 500 includes an act 501 of receiving a database query. In some embodiments, act 501 comprises receiving a database query at a master node or a compute pool within a database system. For example, as was discussed in connection with FIG. 4, database system 400 could include a relational master node 401. If so, this relational master node 401 could receive a database query from an external consumer. Thus, act 501 could comprise the database query being received at the master node. Additionally, or alternatively, database system 400 could include one or more compute pools 405, each including one or more compute nodes. If database system 400 includes both a master node 401 and a compute pool 405, act 501 could comprise the database query being received at the master node 401, and the master node 401 passing the database query to the compute pool 405. Alternatively, act 501 could comprise the database query being received at the compute pool 405 directly (whether or not master node 401 is present). For example, as was discussed in connection with FIG. 1, external consumers might be made aware of compute pool(s) and might be enabled to query them directly.

Method 500 also includes an act 502 of identifying a data pool that caches an external data source. In some embodiments, act 502 comprises, based on receiving the database query, identifying a data pool within the database system, in which (i) the data pool comprises a plurality of data nodes, each data node including a relational engine and relational storage, and (ii) each data node caches a different partition of data from an external data source in its relational storage. For example, in reference to FIG. 4, if the database query was received at the master node 401, then the master node 401 might identify data pool 413a. In another example, the database query might have been received at master node 401 and passed to compute pool 405a, in which case compute pool 405a could identify data pool 413a. In yet another example, the database query could have been received by compute pool 405a directly, in which case compute pool 405a could identify data pool 413a.

As shown in FIG. 4, data pool 413a includes a plurality of data nodes 414a, each including a relational engine 415 and relational storage 416. As was discussed in connection with FIG. 4, each data node 414 could cache a different partition of data from an external data source in its relational storage 416. For example, in FIG. 4, database system 400 includes an external database 418a (e.g., a relational database, or unstructured data that can be readily converted to relational data). This external database 418a includes data that can be partitioned into at least two partitions 419a/419b. Arrows 421a/421b show that these partitions 419 can be ingested into data pool 413a, with each partition 419 being cached at a different data node 414 as a corresponding copy 420. In embodiments, partitions of data from the external data source (e.g., external data source 418a) comprises data that is vertically partitioned and/or horizontally partitioned. Additionally, or alternatively, as discussed in connection with FIG. 3, a plurality of data nodes 314 could shard and/or replicate at least one row of data (e.g., shard 319) of data from the external database 418a across the plurality of data nodes 314.

Method 500 also includes an act 503 of processing the database query across a plurality of data nodes. In some embodiments, act 503 comprises processing the database query across the plurality of data nodes, including requesting that each data node perform a filter operation against its cached partition of the external data source stored in its relational storage, and return any data from the partition that matches the filter operation. For example, master node 401 could query each data node 414 of data pool 413*a*. As such, act 503 could comprise the master node processing the database query across the plurality of data nodes. Additionally, or alternatively, compute nodes 406 of compute pool 405*a* could query each data node 414 of data pool 413*a*. Specific examples of querying a data pool by a compute pool are shown in FIGS. 2B and 2C. As such, act 503 could comprise the compute pool processing the database query across the plurality of data nodes. For example, as shown by arrows 217*g* and 217*i*, compute node 206*a* could query data node 214*a*, and compute node 206*n* could query data node 214*n*. FIG. 2D shows that, based on this querying, one or more of the data nodes can return results (i.e., as indicated by arrow 217*k*). From the discussion of FIGS. 2B and 2C, it is clear that, when querying is performed by a compute pool, act 503 could comprise the compute pool processing the database query across the plurality of data nodes by using a different compute node to query each data node.

When a data node performs a filter operation against its cached partition of the external data source stored in its relational storage, it could do so using its relational engine 415. Thus, method 500 could include data node performing the filter operation against its cached partition of the external data source stored in its relational storage using its relational engine.

Method 500 need not be limited to querying data nodes. For example, as shown in FIG. 4, database system 400 could also include one or more storage pools. As such, the computer system performing method 500 could also comprise a storage pool comprising a plurality of storage nodes, each storage node comprising a relational engine, a big data engine, and a big data storage. In these embodiments, the computer system can also process the database query across the plurality of storage nodes, including requesting that each storage node perform a query operation against a partition of data stored in its big data storage, and return any data from the partition that is produced by the query operation.

As was discussed, a compute pool can aggregate results received from data nodes and/or storage nodes. For example, referring to FIG. 2D, compute nodes 206*a* and 206*n* receive data portions 219*a*-219*c* from storage nodes 209*a* and 209*n* and data node 214*a*, and compute nodes 206*a* and 206*n* can then aggregate those data portions 219. Thus, method 500 can also include the compute pool aggregating results received by each compute node (i.e., from data nodes and/or storage nodes).

As was discussed in connection with FIG. 1, compute pools 105, storage pools 108, and data pools 113 enable database system 100 to dynamically expand and contract its compute capacity, its big data storage and processing capacity, and/or its relational storage and processing capacity. Thus, the computer system performing method 500 could expand its compute capacity by adding one or more compute nodes, could expand its big data storage capacity by adding one or more storage nodes, and/or could expand its relational storage capacity by adding one or more data nodes. Any of these capacities could be contracted by removing respective nodes.

Also, as discussed in connection with FIG. 4, a query could join data from multiple external data sources (e.g., external data sources 418) having different types. For example, tables from two different types of relational databases could exposed to database management system 400. Then, a query could be developed that includes data from both of these two external tables. Thus, in method 500, the database query could be processed against a plurality of external tables that joins a plurality of external data sources.

Accordingly, the embodiments herein provide for scale out data storage and query filtering using data pools in a database system. As discussed, data pools enable the database system to scale out relational storage and relational processing capacity. Data pools can be configured to ingest data from one or more external data sources, such as by ingesting and caching a different partition of an external data source at each data node in a data pool. These embodiments represent significant advancements in the technical field of databases. For example, by providing for data pools, the embodiments herein enable relational database scale out functionality that has not been available before. Additionally, by enabling a data pool to ingest and cache external data sources, embodiments can provide for seamless migrations, can provide scale-out to queries over data sourced from external data sources, and can improve query performance of data sourced from external data sources.

It will be appreciated that embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
one or more processors; and
one or more computer-readable media having stored thereon computer-executable instructions that, when executed at the one or more processors, cause the computer system to perform the following:
receive a first database query at a master node or a compute pool within a database system, the first database query targeting an external data source;
based on receiving the first database query, and based on the first database query being a read query:
identify a data pool within the database system, in which, (i) the data pool comprises a plurality of data nodes, each data node including a relational engine and relational storage; and (ii) each data node caches a different partition of data from the external data source in its relational storage; and
process the first database query across the plurality of data nodes, including requesting that each data node perform a filter operation against its cached partition of the external data source stored in its relational storage, and return any data from the partition that matches the filter operation;
receive a second database query at the master node or the compute pool within the database system;
based on receiving the second database query, and based on the second database query being a write query, route the second database query to the external data source, which modifies at least one record in the external data source; and
subsequent to routing the second database query to the external data source, ingest the modified at least one record from the external data source into the data pool.

2. The computer system as recited in claim 1, wherein the first database query is received at the master node, and wherein the master node processes the first database query across the plurality of data nodes.

3. The computer system as recited in claim 1, wherein the first database query is received at the master node, and wherein the master node passes the first database query to the compute pool, which processes the first database query across the plurality of data nodes.

4. The computer system as recited in claim 1, wherein the first database query is received at the compute pool, and wherein the compute pool processes the first database query across the plurality of data nodes.

5. The computer system as recited in claim 4, wherein the compute pool processes the first database query across the plurality of data nodes by using a different compute node to query each data node.

6. The computer system as recited in claim 5, wherein the compute pool aggregates results received by each compute node.

7. The computer system as recited in claim 1, wherein each data node performs the filter operation against its cached partition of the external data source stored in its relational storage using its relational engine.

8. The computer system as recited in claim 1, wherein compute capacity of the computer system is expanded by adding one or more additional compute nodes.

9. The computer system as recited in claim 1, wherein relational storage capacity of the computer system is expanded by adding one or more additional data nodes.

10. The computer system as recited in claim 1, wherein the computer system also comprises a storage pool comprising a plurality of storage nodes, each storage node comprising a relational engine, a big data engine, and a big data storage.

11. The computer system as recited in claim 10, wherein the computer system also processes the first database query across the plurality of storage nodes, including requesting that each storage node perform a query operation against a partition of data stored in its big data storage, and return any data from the partition that is produced by the query operation.

12. The computer system as recited in claim 1, wherein each different partition of data from the external data source comprises data that is vertically partitioned.

13. The computer system as recited in claim 1, wherein each different partition of data from the external data source comprises data that is horizontally partitioned.

14. The computer system as recited in claim 1, wherein the first database query is processed against an external table that joins a plurality of external data sources.

15. The computer system as recited in claim 1, wherein the plurality of data nodes shard and/or replicate at least one row of data across the plurality of data nodes.

16. A method, implemented at a computer system that includes one or more processors, for performing a distributed query across a data pool, the method comprising:
　receiving a first database query at a master node or a compute pool within a database system, the first database query targeting an external data source;
　based on receiving the first database query, and based on the first database query being a read query:
　　identifying a data pool within the database system, in which, (i) the data pool comprises a plurality of data nodes, each data node including a relational engine and relational storage; and (ii) each data node caches a different partition of data from the external data source in its relational storage;
　　processing the first database query across the plurality of data nodes, including requesting that each data node perform a filter operation against its cached partition of the external data source stored in its relational storage, and return any data from the partition that matches the filter operation;
　receiving a second database query at the master node or the compute pool within the database system;
　based on receiving the second database query, and based on the second database query being a write query, routing the second database query to the external data source, which modifies at least one record in the external data source; and
　subsequent to routing the second database query to the external data source, ingesting the modified at least one record from the external data source into the data pool.

17. A method as recited in claim 16, wherein the first database query is received at the master node, and wherein the master node passes the first database query to the compute pool, which processes the first database query across the plurality of data nodes.

18. A method as recited in claim 16, wherein the first database query is received at the compute pool, and wherein the compute pool processes the first database query across the plurality of data nodes by using a different compute node to query each data node.

19. A method as recited in claim 16, wherein the plurality of data nodes shard and/or replicate at least one row of data across the plurality of data nodes.

20. A computer program product comprising hardware storage devices having stored thereon computer-executable instructions that, when executed at one or more processors, cause a computer system to perform the following:
　receive a first database query at a master node or a compute pool within a database system, the first database query targeting an external data source;
　based on receiving the first database query, and based on the first database query being a read query:
　　identify a data pool within the database system, in which, (i) the data pool comprises a plurality of data nodes, each data node including a relational engine and relational storage; and (ii) each data node caches a different partition of data from the external data source in its relational storage; and
　　process the database query across the plurality of data nodes, including requesting that each data node perform a filter operation against its cached partition of the external data source stored in its relational storage, and return any data from the partition that matches the filter operation;
　receive a second database query at the master node or the compute pool within the database system;
　based on receiving the second database query, and based on the second database query being a write query, route the second database query to the external data source, which modifies at least one record in the external data source; and
　subsequent to routing the second database query to the external data source, ingest the modified at least one record from the external data source into the data pool.

\* \* \* \* \*